[19] United States Patent
Hsu

[11] 4,021,582
[45] May 3, 1977

[54] WATER-DISPERSIBLE COMPOSITION AND PROCESS FOR PRODUCTION

[75] Inventor: Jau Yann Hsu, Brookfield, Conn.

[73] Assignee: Societe d'Assistance Technique pour Produits Nestle S.A., Lausanne, Switzerland

[22] Filed: Feb. 13, 1976

[21] Appl. No.: 657,759

[52] U.S. Cl. .............................. 426/99; 252/363.5; 426/285; 426/302; 426/307
[51] Int. Cl.$^2$ .......................................... A23L 1/00
[58] Field of Search ............ 426/285, 302, 307, 96, 426/97, 99; 252/363.5

[56] References Cited

UNITED STATES PATENTS

| 2,554,143 | 5/1951 | Hinz et al. | 426/99 |
| 2,911,300 | 11/1959 | Peeblex | 426/99 |
| 3,199,985 | 8/1965 | Mourey | 426/99 |
| 3,362,829 | 1/1968 | Landfried et al. | 426/99 |
| 3,377,171 | 4/1968 | Ryan et al. | 426/99 |

OTHER PUBLICATIONS

The Condensed Chemical Dictionary, 8th Ed., 1971, Revised by Hawley, Van Nostrand Reinhold Co., New York, p. 783.

Primary Examiner—Joseph M. Golian
Attorney, Agent, or Firm—Watson Leavenworth Kelton & Taggart

[57] ABSTRACT

A water-dispersible composition is disclosed. This composition contains co-agglomerates of finely-divided particles of a normally non-dispersible material and a silicon dioxide flow agent having a thin coating of edible fat. The composition may optionally include flavorants and other additives.

10 Claims, No Drawings

WATER-DISPERSIBLE COMPOSITION AND PROCESS FOR PRODUCTION

BACKGROUND OF THE INVENTION

Throughout the arts, there are encountered instances in which it is desired to produce aqueous solutions or dispersions containing a material or materials difficult to disperse directly in water. Upon addition to aqueous liquids, these materials ordinarily form lumps which may not disintegrate even under the most severe conditions of admixture.

It is an object of this invention to modify these non-dispersible materials through a combination of additives which increase the speed with which they are dispersed in aqueous medium.

It is a further object of this invention to increase the completeness of dispersion of these difficult to disperse compositions in aqueous medium, so as to permit the production of essentially homogeneous solutions and/or dispersions.

This invention also seeks to produce dry compositions containing ordinarily dispersible and non-dispersible material, but which are rendered completely dispersible in aqueous liquid so as readily to permit the production of aqueous based foods and other products.

These, and other objects and advantages as are described in this specification, are achieved through the present invention.

DESCRIPTION OF THE INVENTION

This invention is concerned with the production of aqueous dispersions and/or solutions containing materials which are difficult to place in these forms. These materials are well-known in the art. They comprise solids which are usually edible and of predominantly hydrophobic character. Examples of essentially non-dispersible materials include dehydrated cheeses, caseinates, protein isolates (particularly soy), milk powders, raw and pre-cooked flours (such as wheat or pea flour) and the like.

There exist many uses, such as in soups, sauces, prepared dishes and other food products, for these aqueous dispersions and solutions of this invention. The desirability of ready dispersion of these materials and of compositions which contain them is also self-evident. It simplifies their conversion from a stable and/or compact dry form into that in which they are eventually utilized.

Another class of common, non-dispersible materials is thickening agents. These materials—such as starches (particularly pre-gelatinized starch), gums and the like—are commonly employed to increase the viscosities of aqueous solutions. Although common in glues, paints and like compositions, they are most often utilized in foods to provide desirable body and texture.

In the context of this invention, a "non-dispersible material" is defined as a powdered solid which, upon being added to 80° C water in a desired amount capable of producing an essentially homogeneous liquid phase, will not do so after 20 seconds of hand-stirring. Instead of a single homogeneous phase, separate solid and liquid phases—usually containing substantial, sticky lumps—results.

With many compositions, individual constituents which would alone be dispersible, are additive in their effect and produce a non-dispersible material. In addition, dispersibility is dependent upon the weight ratio of solid material to aqueous liquid in which it is to be dispersed. Thus, while the non-dispersible material may be an essentially pure composition or compound, it may also comprise two or more constituents (whether or not they would alone be dispersible).

The objects and advantages of this invention do not require that all of the non-dispersible material of a given composition be treated as described hereinafter. Because of the ratio and additive properties noted above, treatment of only a fraction of that material is often sufficient to render the entire composition water-dispersible.

In accordance with this invention, compositions containing a material which would otherwise not be water-dispersible are readily converted into aqueous dispersions and/or solutions through a unique co-action of silicon dioxide flow agent and edible fat. In order to achieve this co-action, these additives must be combined with the non-dispersible material of the composition in a particular manner. More specifically, it is necessary that finely-divided particles of the non-dispersible material and of the silicon dioxide be co-agglomerated before the edible fat is coated over their external surfaces.

By "co-agglomerates" are mean physically—as opposed to chemically—bonded particles of the non-dispersible material with particles of silicon dioxide. This agglomeration is believed to be achieved through hydrogen-bonding occurring between the respective surfaces of dissimilar constituent particles. It is not intended, however, to limit this invention by such theory inasmuch as it is known that, by whatever mechanism this bonding is achieved, an intimate adhesion between the particles is obtained.

These co-agglomerates may be composed of up to 8%, preferably from 0.5 to 5% of silicon dioxide by weight of non-dispersible material. Modification of silicon dioxide concentration within these limits may be desirable where the ultimate aqueous product is intended for consumption. In many jurisdictions, the permissible concentration of silicon dioxide in a food is limited by law (at the present time, for example, only 2% by food weight is allowed in the United States). Consequently, the desired amount of silicon dioxide in the agglomerates may be limited by the total weight of other materials, including the aqueous liquid, in the ultimate product.

As a result of this formation of co-agglomerates of non-dispersible material and silicon dioxide flow agent, the edible fat coating covers only the external portion of the entire surface of a given particle. This covered "external" portion is the outer surface of the co-agglomerate. Thus this external surface does not include that portion of any given particle of non-dispersible material or silicon dioxide which is contingent with another particle and by virtue of which the two dissimilar particles are bonded into a co-agglomerate.

To form an external coating only, the fat is added to already formed co-agglomerates of non-dispersible material and silicon dioxide. Only after an intimate admixture of these particulate materials has been formed, so as to permit the production of co-agglomerates, is the edible fat coating applied. Most conveniently, this application is performed by spraying liquid fat onto the co-agglomerates. Blending or admixture of the resultant composite is then preferred to ensure uniformity of coating.

The reason for the criticality of this sequence of processing steps appears to reside in the interference with co-agglomerate production which otherwise occurs. In the absence of pre-agglomeration, the particles are essentially completely coated by the edible fat. This coating insulates the particles and prevents or impairs the surface adhesion or bonding between particle surfaces necessary to produce the present co-agglomerates.

It has been discovered that finely-divided particles increases the ease of dispersion and produce aqueous compositions of maximum homogeneity. It is therefore desired that the silicon dioxide be extremely finely-divided, having an average particle size (diameter) of less than about 5 micron, preferably less than 0.5 micron, and most preferably less than 0.05 micron. Silicon dioxide particles of these sizes are readily available as commercial flow agents.

It is similarly desirable to use finely-divided particles of the non-dispersible material in forming these co-agglomerates. Although their particle sizes vary greatly, depending upon the specific material employed, the smallest are preferred. In many cases, it is advantageous to grind or otherwise comminute commercially available forms of non-dispersible material in order to obtain particles having diameters of less than 100 micron, preferably less than 40 micron, and which therefore will produce more finely-divided co-agglomerates.

The conditions under which the non-dispersible material and silicon dioxide are combined to produce co-agglomerates also affects the ease and homogeneity of dispersion. These particles are preferably blended together to provide intimate admixture and minimize like-particle agglomeration. High-shear mixing has been found to be particularly useful for these functions. Such mixing also produces very small co-agglomerates, which are still more readily dispersible.

The amount of fat added to the co-agglomerates should be sufficient to coat their external surfaces. No benefit is obtained from excess, non-coating fat. Accordingly, from about 5 to 30%, preferably 10 to 25%, of fat by weight of co-agglomerates to be coated is ordinarily utilized.

Coating materials useful in accordance with this invention include animal and vegetable fats which are normally solid or liquid—these latter fats commonly being referred to as "oils". Thus, for example, saturated or unsaturated, and mixtures of various oils and fats are all useful. Exemplary of the materials are corn, cottonseed, soy bean and other commercially available oils and fats. They are ordinarily sprayed onto the pre-formed agglomerates. (Thus, if normally solid, they should first be melted and applied at elevated temperatures while liquid). The resultant admixture is then preferably blended at a temperature which permits uniform liquid coating.

The compositions of this invention are preferably ones intended for reconstitution with hot (i.e. from about 75° to 100° C) aqueous liquids. It is therefore not essential that the coating for the co-agglomerates comprise a liquid or lower melting fat. Preferably, however, a fat (or oil) having a melting point below 50° C, more desirably below 10° C, is utilized. Such fat coatings increase the speed and homogeneity of dispersion.

If desired, these edible fats may additionally include a small amount of emulsifier to improve the wettability of the coated agglomerates. It is preferred that the fat contain from about 0.1 to about 2% by weight of a fat-water emulsifier such as lecithin, mono- or diglyceride ester.

In many instances, the coated co-agglomerates of this invention will be utilized in the preparation of composite reconstitutable food materials. Thus, for example, this invention has particular applicability for the production of dry soup, gravy, pudding, salad dressing and like mixes which the consumer can readily convert into useful aqueous products.

The additives which are combined with the present coated co-agglomerates to produce these dry or "instant" mixes, however, are normally readily dispersible and/or soluble themselves. Thus, for example, they commonly include sugar, salt, and other common flavorants as are customary ingredients in such products.

These already dispersible additives neither require, nor interfere with, the mechanism of this invention. Consequently, they may be added to or blended with the coated co-agglomerates having regard solely to the organoleptic character and appearance desired for the reconstituted product. This permits production of complete "instant" mixes which then require admixture only with water or another aqueous based medium for production of the desired end product.

This invention is further illustrated by the following examples in which all percentages are on the basis of weight unless otherwise indicated.

EXAMPLE 1

A water-dispersible starch composition is prepared as follows:

775 g of pre-gelatinized starch is admixed with 25 g of silicon dioxide having an average particle size of about 0.014 micron. After 10 minutes of high shear mixing, 200 g of a melted hydrogenated vegetable oil (M.P.=35° C) is sprayed onto the heated admixture. The blending is continued at 50° C for an additional 10 minutes and the coated co-agglomerates are then cooled to room temperature.

6.5 g of the coated co-agglomerates is placed in a 250 ml beaker. 5 g of the same pre-gelatinized starch (an amount equivalent to that in the co-agglomerates) is placed in a second 250 ml beaker. 150 ml aliquots of 100° C water are then added to each beaker and the respective contents stirred for 20 seconds by hand.

After mixing, differences between the contents of the two beakers are readily apparent. The beaker containing pre-gelatinized starch only shows an essentially aqueous phase having large lumps of undispersed starch. The beaker containing the coated co-agglomerates of this invention, however, shows an essentially homogeneous dispersion. No solid particles are apparent.

The viscosities of the contents of the two beakers are then compared by measuring their times of passage through a 100 ml viscosity tube of 0.044 cm diameter. 100 ml of distilled water passes through this tube in 10 seconds. The solution formed from the coated co-agglomerates of this invention has a passage time of 12 seconds. With the solution containing starch only, however, the tube is quickly clogged by the lumps of undispersed starch and no measurement is possible.

EXAMPLE 2

A water-dispersible dehydrated cheese composition is prepared in the same manner as in Example 1. This dehydrated cheese premix has the following composition:

| | |
|---|---|
| Dehydated Cheddar Cheese | 88% |
| Silicon Dioxide (2.0μ) | 2% |
| Hydrogenated Vegetable Oil | 10% |
| (0.5% of Lecithin | |
| (M.P. =22° C) | |
| | 100% |

Comparison of the coated, co-agglomerates with an equivalent amount of dehydrated cheese by reconstitution with 90° C water again shows improvement in dispersibility. The improvement is not, however, as great as that shown in Example 1.

EXAMPLE 3

A water-dispersible wheat flour composition is prepared in the same manner as in Example 1. This wheat flour premix has the following composition:

| | |
|---|---|
| Wheat Blending Flour | 78% |
| Silicon Dioxide (0.007μ) | 2% |
| Vegetable Oil (M.P. = 5° C) | 20% |
| | 100% |

1.3 g of the coated co-agglomerates are readily dispersed in 150 ml of 90° C water, whereas 1.0 g of the flour produces significant lumping.

EXAMPLE 4

A pea powder is prepared in the same manner as in Example 1. The pea powder premix has the following composition:

| | |
|---|---|
| Dried Pea Powder | 81.5% |
| Silicon Dioxide (0.014μ) | 2.5% |
| Hydrogenated Vegetable Oil | 16.0% |
| (M.P. = 15° C) | |
| | 100 % |

12.5 g of the coated co-agglomerates is mixed with 4 g of the pre-gelatinized starch and placed in a 250 ml beaker. 10 g of the same dried pea powder (an amount equivalent to that in the co-agglomerates) is mixed with 4 g of pre-gelatinized starch and placed in a second 250 ml beaker. 150 ml aliquots of 100° C water are then added to each beaker and the respective contents stirred for 20 seconds by hand.

The contents of the first beaker produce a homogeneous dispersion despite the presence of untreated starch. The contents of the second beaker, however, are only partially dispersed and show large sticky lumps of solid material.

EXAMPLE 5

A skimmed milk powder is prepared in the same manner as in Example 1. The skimmed milk powder premix has the following composition:

| | |
|---|---|
| Skimmed Milk Powder | |
| (Spray Dried) | 82% |
| Silicon Dioxide (0.014μ) | 2% |
| Hydrogenated Vegetable Oil | 16% |
| (M.P. = 22° C) | |
| | 100% |

13 g of the coated co-agglomerates is mixed with 2 g of the pre-gelatinized starch and placed in a 250 ml beaker. 10 g of the same skimmed milk powder (an amount equivalent to that in the co-agglomerates) is mixed with 2 g of pre-gelatinized starch and placed in a second 250 ml beaker.

150 ml aliquots of 90° C water are then added to each beaker and the respective contents stirred for 20 seconds by hand. Reconstitution yields results similar to those of Example 4.

EXAMPLE 6

A buttermilk powder is prepared in the same manner as in Example 1. The buttermilk powder premix has the following composition:

| | |
|---|---|
| Cultured Buttermilk Powder | 82% |
| Silicon Dioxide (0.014μ) | 3% |
| Hydrogenated Vegetable Oil | 15% |
| (M.P. = 15° C) | |
| | 100% |

6.5 g of the coated co-agglomerates is mixed with 2 g of pre-gelatinized starch and placed in a 250 ml beaker. 5 g of the same buttermilk powder (an amount equivalent to that in the co-agglomerates) is mixed with 2 g of pregelatinized starch and placed in a second 250 ml beaker.

Reconstitution of the beaker contents with 150 ml aliquots of 85° C water shows the improved dispersibility of the powder containing coated co-agglomerates.

EXAMPLE 7

A soy protein powder is prepared in the same manner as in Example 1. The soy protein isolate premix has the following composition.

| | |
|---|---|
| Soy Protein Isolate | 82% |
| Silicon Dioxide (0.014μ) | 3% |
| Hydrogenated Vegetable Oil | 15% |
| (M.P. = 15° C) | |
| | 100% |

2 g of the coated co-agglomerates is mixed with 8 g of sugar and placed in a 250 ml beaker. 1.6 g of the same soy protein isolate (an amount equivalent to that in the co-agglomerates) is mixed with 8 g of sugar and placed in a second 250 ml beaker.

The contents of the first beaker are significantly more readily and completely dispersed upon reconstitution with 150 ml of 90° C water.

EXAMPLE 8

Instant Soup Mix

A powdered cream style instant soup is prepared from 100 g of the coated co-agglomerates of Example 1 and a dry flavor base of the following composition:

| | |
|---|---|
| Non-Dairy Powdered Cream | 112 g |
| Flavoring Agents | 79 g |
| Dehydrated Vegetables | 6 g |
| Spices | 6 g |
| | 203 g |

This mix, having a total weight of 203 g, is designated Sample "A".

Additional mix samples are prepared for comparative testing as follows:

| | |
|---|---|
| Sample "B" | A mix is prepared by simultaneous admixture of 77.5 g of pre-gelatinized starch, 2.5 g silicon dioxide and 20 g hydrogenated vegetable oil (the corresponding amounts of starch, silicon dioxide and oil as are present in the coated co-agglomerate of Sample "A"). This mix is then combined with 203 g of the additive flavor base identified above. |
| Sample "C" | This mix is prepared by blending 203 g of the flavor base with 77.5 g of pre-gelatinized starch. |
| Sample "D" | This mix is prepared by blending 203 g of the flavor base with a mix of 20 g of hydrogenated vegetable oil and 77.5 g of pre-gelatinized starch. |
| Sample "E" | This mix is prepared by blending 203 g of the flavor base with a mix of 2.5 g of silicon dioxide and 77.5 g of pre-gelatinized starch. |

The following amounts of each of these sample compositions are added to 250 ml beakers:

| | |
|---|---|
| Sample "A" | 20 g |
| Sample "B" | 20 g |
| Sample "C" | 18.5 g |
| Sample "D" | 19.8 g |
| Sample "E" | 18.7 g |

170 ml of water at a temperature of 90° C is then introduced into each beaker and the contents are stirred by hand for 10 seconds. The results of this comparative test show substantial differences in the dispersibility of the samples and in the textures of the aqueous reconstitutes:

Sample "A": This reconstitute is homogeneous in appearance. There are no evident solids in the soup which is of smooth, thick texture.

Sample "B": This sample does not disperse as well as Sample "A". Its reconstitute is coarser in texture than that of Sample "A".

Sample "C": This sample has poor dispersibility producing distinct solid and liquid phases. The viscosity is low, being only slightly greater than that of water.

Sample "D", Sample "E": Both samples have better dispersibility than Sample "C" but not as good as Samples "A" and "B". Sample "E" has a very coarse texture, while Sample "D" is very watery.

I claim:

1. A water-dispersible edible composition comprising an intimate admixture of co-agglomerates of a finely-divided non-dispersible material and a silicon dioxide flow agent, said co-agglomerates having a thin coating of edible fat over their external surfaces.

2. The composition of claim 1, in which the co-agglomerates comprise up to 8% of silicon dioxide by weight of non-dispersible material and are coated with from 5 to 30% by weight of edible fat.

3. The composition of claim 2, in which the edible fat comprises 10 to 25% by weight of said co-agglomerates.

4. The composition of claim 2, in which the co-agglomerates comprise from 0.5 to 5% of silicon dioxide by weight of non-dispersible material.

5. The composition of claim 3, in which the edible fat contains an emulsifier.

6. The composition of claim 1, in which said composition additionally contains particulate, water-soluble and dispersible flavorant.

7. The composition of claim 1, in which the non-dispersible material comprises a thickening agent.

8. The process for producing the composition of claim 1 comprising subjecting finely-divided particles of non-dispersible material and silicon dioxide flow agent to high shear mixing to produce an intimate admixture of co-agglomerates and thereafter coating said co-agglomerates with edible fat.

9. The process of claim 8, in which the coating is performed by spraying and blending edible fat onto the external surfaces of the co-agglomerates.

10. The process of claim 8, in which the coated co-agglomerates are blended with particulate, water-soluble and dispersible flavorant.

* * * * *